Figure 1:
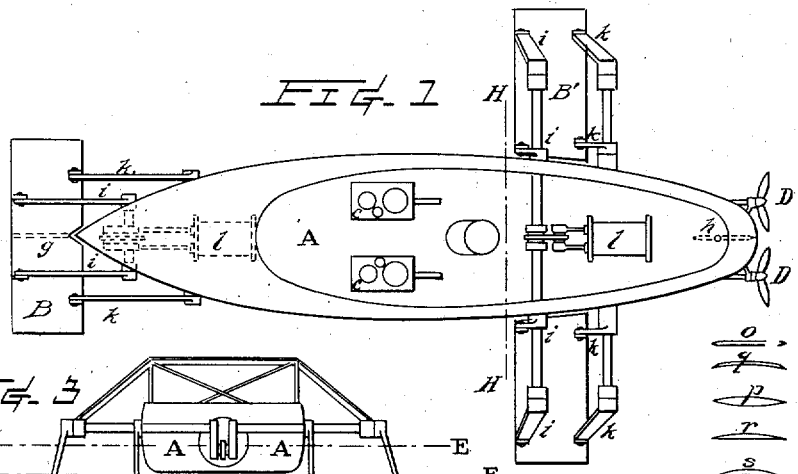

No. 12,791. REISSUED MAY 12, 1908.

S. A. REEVE.

MARINE NAVIGATION.

APPLICATION FILED FEB. 8, 1908.

WITNESSES:

Horace Barnes

Lewis D. Crossett

INVENTOR.

Sidney A. Reeve

BY

Pierre Barnes

ATTORNEY.

UNITED STATES PATENT OFFICE.

SIDNEY A. REEVE, OF NEW HAVEN, CONNECTICUT, ASSIGNOR TO WILLIAM M. MEACHAM AND LARNED E. MEACHAM, OF CHICAGO, ILLINOIS.

MARINE NAVIGATION.

No. 12,791. Specification of Reissued Letters Patent. Reissued May 12, 1908.

Original No. 811,743, dated February 6, 1906, Serial No. 557,796. Application for reissue filed February 8, 1908. Serial No. 415,007.

*To all whom it may concern:*

Be it known that I, SIDNEY A. REEVE, of New Haven, in the county of New Haven and State of Connecticut, have invented certain new and useful Improvements in Marine Navigation; and I do hereby declare the following to be a full, clear, and exact description of the invention, such as will enable others skilled in the art to which it appertains to make and use the same.

My invention relates to that class of vessels—such as steam-yachts, torpedo-boats, mail-steamers, &c.—which to-day constitute the speediest class of means for travel by water and which are built with a view chiefly to speed, other considerations being held of secondary importance, also to those vessels propelled by mechanical power. I do not confine my invention, however, to vessels of any particular size or for any particular purpose, but hold that it applies to any vessel to which it may prove to be adapted or adaptable.

It is well known that the limits in speed to which vessels are confined are due to the resistance to rapid movement of the water displaced by the hull and to its friction on the surface of that hull when moved through the water, which is commonly called "skin friction." It is also well known that the water thus displaced must equal in weight that of the vessel and its contents. All attempts at the attainment of higher speeds, therefore, have hitherto consisted, aside from improvement in the means of propulsion and in the form of the hull, in attempts to lighten, in proportion to its size and power, the vessel and its contents, it being always believed that the amount of water which must be passed from in front of to behind the vessel in each period of time in which the latter travels a distance equal to its own length must be exactly equal in weight to the vessel and its contents.

My method may be practiced by means of a plate or a set of plates, plane or curved, which are pivotally fastened to the vessel's hull and are immersed in the surrounding water in such a position that the general direction of their surfaces is somewhat upwardly inclined to the line of the vessel's motion at such an angle that the water coming in contact with these plates, by reason of the advance through the water of the vessel and the plates and the water adjacent thereto, is projected approximately vertically downward and left with a certain velocity in that direction.

My invention therefore relates to the increase or facilitation of high speed in navigation, not by attempting to lighten a given hull or its contents or by any attempt at reducing the resistance of displacement of the weight of water equal to that of the given hull, but by lessening the amount of water so displaced with regard to a certain weight of hull by substituting in whole or in part for the flotative force of displaced water (which force is independent of motion) the reactionary force due to an alteration in velocity or direction of the motion of the water moving past the vessel.

In order to better illustrate the device described, I append drawings, in which,—

Figure 3:
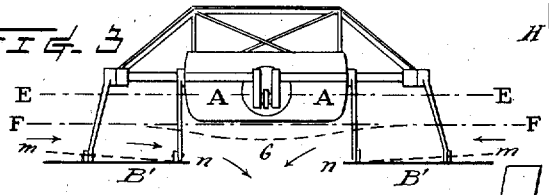
Figure 5:
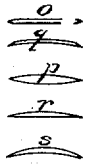
Figure 2:
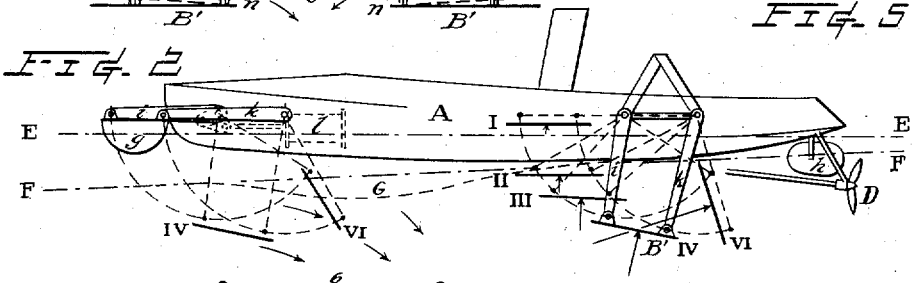
Figure 6:
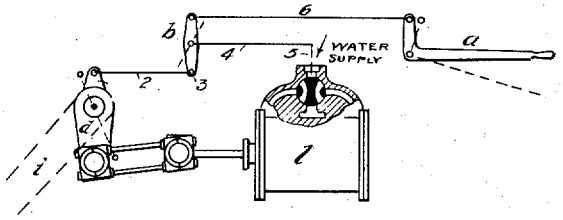
Figure 4:
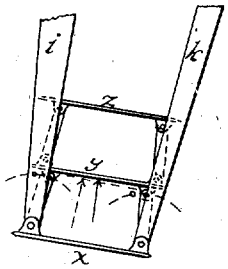

Figure 1 is a plan view; Fig. 2, a side elevation. Fig. 3 is a midship cross-section looking toward the right from line H H of Fig. 1. Fig. 4 is a detail view of a modification hereinafter described. Fig. 5 illustrates in edge views different shapes of plates. Fig. 6 is a detail side elevation of the hydraulic cylinder and connections for operating the shafts carrying the plates, the connections for operating the valve of the cylinder being indicated diagrammatically.

A is the hull, propelled by the twin screws D D, which are driven by the engines C C. To the hull A are fastened the plates B B′ B′ by means of the swinging arms or links *i k*. The use of such arms or means of attachment is only a preferred method of attachment which may be replaced by another. The swinging arms or links are actuated to raise or lower the plates into or out of the water or to vary their angular position by a connection with the hydraulic cylinders *l*, which are operated or locked under accumulated hydraulic pressure by a valve-motion under control of the vessel's pilot. The valve-motion whereby the pistons of these cylinders, and therefore the arms and plates also, are made to follow the motion and retain the position of the pilot's hand-lever may be such as are ordinarily used in connection with hydraulic operating and locking cylinders. A preferable way of arranging these connections is shown in Fig. 6, which illustrates an ordinary hydraulic operating and locking mechanism and in which *l* is the hydraulic cylinder, *i* is the swinging link controlling the plate, and *d* a crank driving the shaft on which link *i* is fastened. The cylinder *l* is connected with a water-supply under pressure, which enters as indicated and leaves through a usual exhaust-port. The controlling-valve is a four-way cock controlled by the link *b*, which has no fixed fulcrum. An ear 1, rising from the crank *d*, has a link connection 2 with the lower end 3 of the link *b*, the upper end of which has a link connection 6 with the lever *a*, and the intermediate portion of said link *b* having a link connection 4 with the arm 5 of the valve. Therefore the fulcrum 3 of the link *b* is a movable one controlled by the position of the crank *d*.

*a* is the pilot's hand-lever, which may obviously be situated anywhere on the vessel and control any number of cylinders. As long as the four-way cock is in the position shown in Fig. 6 the piston of the cylinder *l* is evidently locked against any motion. Upon the movement of the lever *a*, however, to any position, such as that indicated by the dotted line, the link *b* oscillates on fulcrum 3, its lower end being temporarily held, and owing to its connection with the valve the latter will be opened and the piston of the cylinder *l* will move to the right until its motion brings the center of the link *b* to its original position, thus closing the valve by means of the connection 4, when the motion of the piston is arrested and locked once more. It is obvious that for each position of lever *a* there will be a corresponding position of link *i*, to which it must move and where it must remain until *a* be again disturbed.

I do not confine myself to the position and arrangement of cylinders as shown in the drawings. The cylinders may preferably be situated outside of the hull and directly connected with the arms or plates or in any other way. Nor do I confine myself to the use of hydraulic cylinders at all. The arms may be actuated by any other form of mechanical power or by hand-power through screws, racks, &c.

The links *i* and *k* are so arranged as to position of centers, length, &c., that the plate upon being immersed thereby first passes almost vertically downward without great angular variation from the horizontal and then as the links approach a vertical position moves more nearly horizontally without great variation in depth below the hull, but with more marked change in angular position in relation to the longitudinal axis of the hull. This motion is shown in Fig. 2 by the dotted lines I, II, III, IV and VI, representing successive positions of the plate in its movement by the links *i* and *k*. In this way during the earlier positions when any vertical force acting on the plate would have a great mechanical advantage over the motive cylinder *l* such vertical forces are reduced to a minimum. In the middle positions, as III and IV, the usual positions of normal operation, when the vertical forces acting on the plate would be very great, the motive cylinder *l* possesses great mechanical advantage over such forces, and, further, by a movement of the whole system the angular adjustment of the plate may be varied considerably without any great variation in such mechanical advantage or relation or in the depth of the plate's depression below the vessel's hull. This action is illustrated in Fig. 2, where the reaction of the water upon the plates B′ B′ is represented by arrows showing the direction and comparative magnitude of the reactionary forces. In position I the force is barely perceptible; but its moment about the center of which swings the link *i* is very great, while the angularity of the crank *d*, Fig. 6, further serves to multiply its effect upon the piston of *l*. In position II the force is much greater, but its moment about the center of *i* is less and *d* is in better position, so that the cylinder which was large enough to start the plate from position I would be large enough to handle it in position II. Position III shows the increase of the force and the decrease of its moment carried still further. By the time position IV is reached the moment of the force has become negative, and it is evident that between III and IV are a number of positions, each giving B′ a different angle with the horizon, through which the plate could be adjusted with very little effort on the part of the cylinder *l* or other controlling mechanism and very little variation in the depth of depression below the hull. The extreme position of the plate and the force acting to check the vessel's motion are shown at position VI. The further value of such an arrangement is shown in the extreme position of the plate at VI. As the speed of navigation increases the danger of accident, chiefly from collision, becomes greater, and some means of checking a vessel's motion becomes more important. In the case of a vessel equipped with my invention should impendence of collision or similar danger be observed the vessel's headway may be quickly checked by the complete release of the links *i* and *k* from all restraint in their circular motion, when the external forces will immediately carry the plate to position VI, where its lifting power will be nearly gone, its immersion become maximum by reason of the consequent settling of the vessel in the water, and its resistance to forward motion very great. It will be seen that a further advantage lies in the fact that any accident to the constraining mechanism of the links *i k* would similarly result in prompt stoppage of the vessel's headway, when the break could be attended to. Figs. 1 and 2 also show a vertical fin *g* attached to a forward plate or to each of the plates, which will coöperate with the rudder *h* to render the vessel able to steer, said plate or plates preventing lateral movement of the forward part of the hull.

In Figs. 2 and 3 the normal water line when the vessel is at rest and supported solely by the flotation of the water displaced by the hull is shown at E E. The position which the hull will tend to assume under the lifting power of the plates is shown by the water-line F F. It is to be understood that the lines E and F referred to are not intended to indicate the actual extremes of the water-line, but only those points toward which there is a tendency of the hull to move, according to the use or non-use of the plates.

I may increase the reactionary forces by the attachment of two or more plates to the same pair of supporting-links. Fig. 4 shows the way I may reinforce a plate by the superposition of one or more secondary plates connected with it by pivoted links, *x* being the main supporting-plate, and *y z* the secondary plates. The connecting-links are attached sufficiently out of parallel, according to the form of the plate, to render the equilibrium of the secondary plates stable, so that they will need no constraining mechanism, but may find and retain their own natural position. Thus any displacement of the plate from its normal position (as, say, to the left to the position represented by dotted lines) would displace the reactionary force, as represented by the arrows, in such a way as to force the plate back again toward its original position. A good conception of this action is gained by turning the drawing upside down and imagining the plates controlled by gravity alone.

Fig. 5 shows different forms of plates shown in vertical longitudinal section in the line of the vessel's motion which I may utilize. *o* represents a plane flat plate of uniform thickness, but as in all cases with its edges suitably sharpened for entrance into and departure from the water. *q* represents a similar plate cylindrically curved or bent either to a circle or a parabola or a conchoid. *p*, *r*, and *s* represent plates of varying thickness formed by the combination of portions of those curves with each other or with a straight line.

Fig. 3 also shows by the dotted lines *m n m n* the position in which my plates may be fixed as to transverse position to promote stability or lifting power, or both. In this aspect the contours of the plates are not necessarily straight lines, as drawn, but may be either of the curves mentioned in the preceding paragraph.

It will be observed that I so locate my plate that each one passes over water not previously traversed by any other plate. The action of the arrangement shown, although I may substitute some or any other, would be such that the bow-plate B would set up in the water beneath the vessel's hull a vertical downward current which would in turn induce surface currents flowing in transversely to the vessel's motion from both sides toward the keel-line. This primary vertical current is represented by arrows in Fig. 2, where G represents the variation in the surface of the water due to the action of the plate B' in its position IV. The arrows represent direction of motion in relation to the vessel, not to the surrounding still water or to the earth. In Fig. 3, G also represents this depression of surface, although it occurs at a point farther forward along the vessel's keel than the line H H. The secondary horizontal transverse currents set up in the effort to fill this void are also shown by arrows in Fig. 3; but in this case the arrows represent motion in relation to the earth. It is to take advantage of these transverse currents, or at least to nullify their otherwise depressing effect upon the plates B', that I may so construct these plates and their connections that the front edges of said plates when in their lowest position is shown by the dotted lines *m n m n* rather than the horizontal full lines. In general, I am aware that such plates or similar ones have been attached to vessels before now, but only for the purpose of maintaining the "trim" of the vessel or to vary its relative depth in the water as to bow and stern or port and starboard sides, such as in United States Patents Nos. 400,592 and 471,212. It is also recognized that any such plate used, for instance, at the stern to trim the vessel ,while resulting in a simultaneous depression of the bow, might incidentally raise the hull as a whole, yet such plates have heretofore always been used with the declared purpose of decreasing the friction with which the vessel might displace its requisite flotative volume or to raise the efficiency of the propeller, both of which purposes are foreign to the purpose of my invention, as stated above. In all previous applications of such plates the lifting power was designed to be a very small fraction of the vessel's weight, merely sufficient to vary its position of equilibrium and insufficient to bodily lift the vessel. It is the purpose of my invention, on the other hand, to elevate the vessel bodily, and thus materially decrease the displacement resistances, substituting therefor the skin friction of the surfaces of the plates only, and the horizontal components of the reactionary lifting force.

What I claim as my invention, and desire to secure by Letters Patent, is—

1. The combination with a mechanically propelled vessel of plates located on each side thereof, and having their front and rear edges independently connected to the vessel by swinging links, and means for swinging the said links on their upper pivots and holding them in adjusted position.

2. The combination with a mechanically-propelled vessel of plates located on each side thereof, and having their front and rear edges independently connected to the vessel by swinging links, a plate extending across and under the bow and having similar swinging links connected therewith, and means for swinging the links on their upper pivots and holding them in adjusted position.

3. The combination with a mechanically-propelled vessel, of the plate B at the bow and the plates B′ each side of the hull, each of said plates having their front and rear edges connected to the vessel by the independent swinging links *i k*, and means for swinging the links on their upper pivots and holding them in adjusted position.

4. In a water-conveyance, the combination with a body or vessel for receiving the passengers or load, of inclined supporting-plates connected thereto and moving edgewise through the water at an inclination to the longitudinal horizontal line to give support to the body or vessel, said inclined supporting-plates extending below the bottom of the body of the vessel, so that when the conveyance is in motion the body of the vessel may be supported entirely above the surface of the water, substantially as specified.

5. In a water-conveyance, the combination with a body or vessel for receiving the passengers or load, of inclined supporting-plates connected thereto and moving edgewise through the water at an inclination to the longitudinal horizontal line to give support to the body or vessel, and a propeller for imparting forward motion to the conveyance, said inclined supporting-plates extending below the bottom of the body of the vessel, so that when the conveyance is in motion the body of the vessel may be supported entirely above the surface of the water, substantially as specified.

6. A self-propelled vessel having a flotative body or hull, and a reactionary surface extended below the molded surface of said hull and of less immersed area than the immersed area of the hull, whereby said hull may be lifted above the surface of the water at high speeds by reaction.

7. The combination with a self-propelled vessel of two or more supporting-plates arranged one above another and attached to the vessel by means of movable standards.

8. In a water-conveyance, the combination with a body or vessel, of a front inclined supporting or carrying plate B, and rear inclined carrying-plates B′ B′, the latter arranged one at each side of the conveyance, and at opposite angles to each other in respect to a transverse horizontal line.

9. In a water-conveyance, the combination with a body or vessel, of a front inclined supporting or carrying plate B, and rear inclined carrying-plates B′ B′, the latter arranged one at each side of the conveyance, and at opposite angles to each other in respect to a transverse horizontal line, and a propeller.

10. The combination with a boat or vessel, of supporting-plates on opposite sides of the vessel and adapted to be extended below the bottom of the same, movable supports for said plates and manually regulated means for adjusting said plates simultaneously as to their angle relative to the line of motion.

11. The combination with a boat or vessel, of supporting-plates on opposite sides of the vessel and adapted to be extended below the bottom of the same, movable supports for said plates, and manually-regulated means for adjusting said plates simultaneously as to depth of submergence.

12. The combination with a self propelled vessel, of plural reactionary or carrying plates, adapted to raise and support said vessel, while in motion above the surface of the water, said plates being disposed on opposite sides of the central longitudinal line thereof and at opposite vertical angles to each other in respect to a transverse horizontal line, substantially as shown.

13. The combination with a self propelled vessel, of reactionary or supporting plates or surfaces, disposed plurally at each side of the central longitudinal line thereof at different levels, the lowest plates or surfaces being below the line of the bottom of the vessel.

Signed at New Haven, Conn. this 3rd day of February, 1908.

SIDNEY A. REEVE.

In the presence of—

LILLA A. REEVE,
ELLA L. PAGE.